United States Patent [19]

Alderson et al.

[11] 3,807,283
[45] Apr. 30, 1974

[54] AXIAL PISTON PUMP OR MOTOR

[75] Inventors: Loren L. Alderson; Frank N. Alexander, both of Hutchinson, Kans.

[73] Assignee: The Cessna Aircraft Company, Wichita, Kans.

[22] Filed: May 18, 1970

[21] Appl. No.: 37,946

[52] U.S. Cl. .................................................. 91/499
[51] Int. Cl. ............................................ F01b 13/04
[58] Field of Search ...... 417/269; 91/490, 499, 501, 91/507

[56] References Cited
UNITED STATES PATENTS

| | | | |
|---|---|---|---|
| 2,699,123 | 1/1955 | Bonnette et al. | 91/505 |
| 3,265,008 | 8/1966 | Ward | 91/490 |
| 3,303,749 | 2/1967 | Ocule | 91/499 |
| 2,677,326 | 5/1954 | Schindle | 417/269 |
| 2,923,251 | 2/1960 | De Lancey | 91/490 |
| 2,691,350 | 12/1954 | Greer | 91/501 |

FOREIGN PATENTS OR APPLICATIONS

| | | | |
|---|---|---|---|
| 622,787 | 12/1959 | Italy | 91/501 |
| 989,240 | 4/1965 | Great Britain | 91/507 |

Primary Examiner—William L. Freeh
Attorney, Agent, or Firm—Edward L. Brown, Jr.

[57] ABSTRACT

A hydraulic axial piston device having a flat bearing plate interposed between the cam surface and piston outer ends. The bearing plate and a pilot radially guiding the bearing plate rotate in synchronization with the pistons. The pilot is joined to the shaft, whereby the side forces on the bearing plate are transmitted to the shaft. In one embodiment the bearing plate forms the race of an antifriction roller bearing in engagement with outer spherical piston ends. In still another embodiment the bearing plate is in engagement with piston slipper shoes and provides a hydrostatic fluid bearing surface for absorbing piston axial thrust. Fluid porting may be provided through the bearing plate.

5 Claims, 5 Drawing Figures

3,807,283

FRANK N. ALEXANDER
LOREN L. ALDERSON
INVENTORS

FRANK N. ALEXANDER
LOREN L. ALDERSON
INVENTORS 3,807,283

AXIAL PISTON PUMP OR MOTOR

BACKGROUND OF THE INVENTION

This invention relates to axial piston pumps or motors and more particularly to improved piloting means for a bearing plate which absorbs the hydraulic axial thrust on the fluid-displacing pistons.

Fluid power devices of the axial piston type are well known and generally include a rotating cylinder block or rotor in which a plurality of reciprocable pistons are annularly arranged. The ends of the pistons extend from the cylinder block to contact an inclined or inclinable face of a nonrotating cam plate which induces piston reciprocation and displacement of fluid as the cylinder block rotates. The hydraulic axial thrust of the pistons exerts concentrated loads and stresses upon the inclined cam surface and creates high wear and friction as the pistons rotate with the cylinder block against this stationary surface. It has been proposed to insert a rotating bearing plate between the pistons and inclined surface to reduce wear on the piston ends.

Such a bearing plate being inclined with the cam surface and not arranged perpendicular to the drive shaft has heretofore been radially positioned or piloted from the stationary housing or cam plate of the unit, rather than from the drive shaft or other rotating member. A consequent drawback to this arrangement has been the efficiency reducing frictional contact between the rotating bearing plate and the non-rotating pilot or positioning member radially locating the bearing plate. Previous attempts to mitigate this frictional drag have met with limited success due, for instance, to inclusion of expensive and bulky antifriction roller bearings between the bearing plate and its pilot.

SUMMARY OF THE INVENTION

The present invention proposes an improved axial pump or motor construction providing a bearing plate pilot member rotating with and radially constrained to the drive shaft.

Engagement means associated with the piston ends contact a rotating bearing plate, adjacent and parallel to the ends inclined cam surface. A snychronously rotating pilot member universally joined to the drive shaft radially positions the bearing plate. A single universal pivot connection is provided between each piston and the bearing plate. The engagement means move or oscillate upon the bearing plate as the cylinder block and pistons, bearing plate and pilot rotate with the drive shaft at approximately the same speed to minimize friction and wear. Piston axial thrust is imposed upon the bearing plate while all force components within the unit directed perpendicularly to the shaft axis are absorbed by the drive shaft bearings. Thus, no bearings other than the drive shaft bearings and bearing plate are needed within the unit to accommodate forces developed during operation.

Additionally, the present invention provides improved means for positively driving the bearing plate in synchronization wth the cylinder block. This is especially advantageous in units where the bearing plate forms part of a hydrostatic bearing means utilized to absorb piston axial thrust In another form of the invention, the bearing plate forms the race of an antifriction roller bearing advantageously arranged to absorb axial thrust both from the pistons as well as the drive shaft.

Another feature of the invention is to provide a bearing plate, driven in synchronization with the cylinder block and radially located by a rotating pilot, capable of providing valved porting of fluid through the pistons to the cylinder block piston chambers.

The terms "synchronization" or "synchronously rotating" as used herein when applied to the related rotation of the cylinder block, bearing plate, pilot, pistons and engagement means acting between the pistons and bearing plate implies approximately equal angular rotational velocity of these elements about their respective axes. It is recognized that because of the non-coincidence of the rotational axes of the various elements, instantaneous speed differences will occur.

These and other objects and advantages of the present invention will become apparent in the following detailed descripton and accompanying drawings.

BRIEF DESCRIPTION OF THE DRAWINGS

In the drawings:

FIGURE 1 EMBODIMENT

Figure 1:
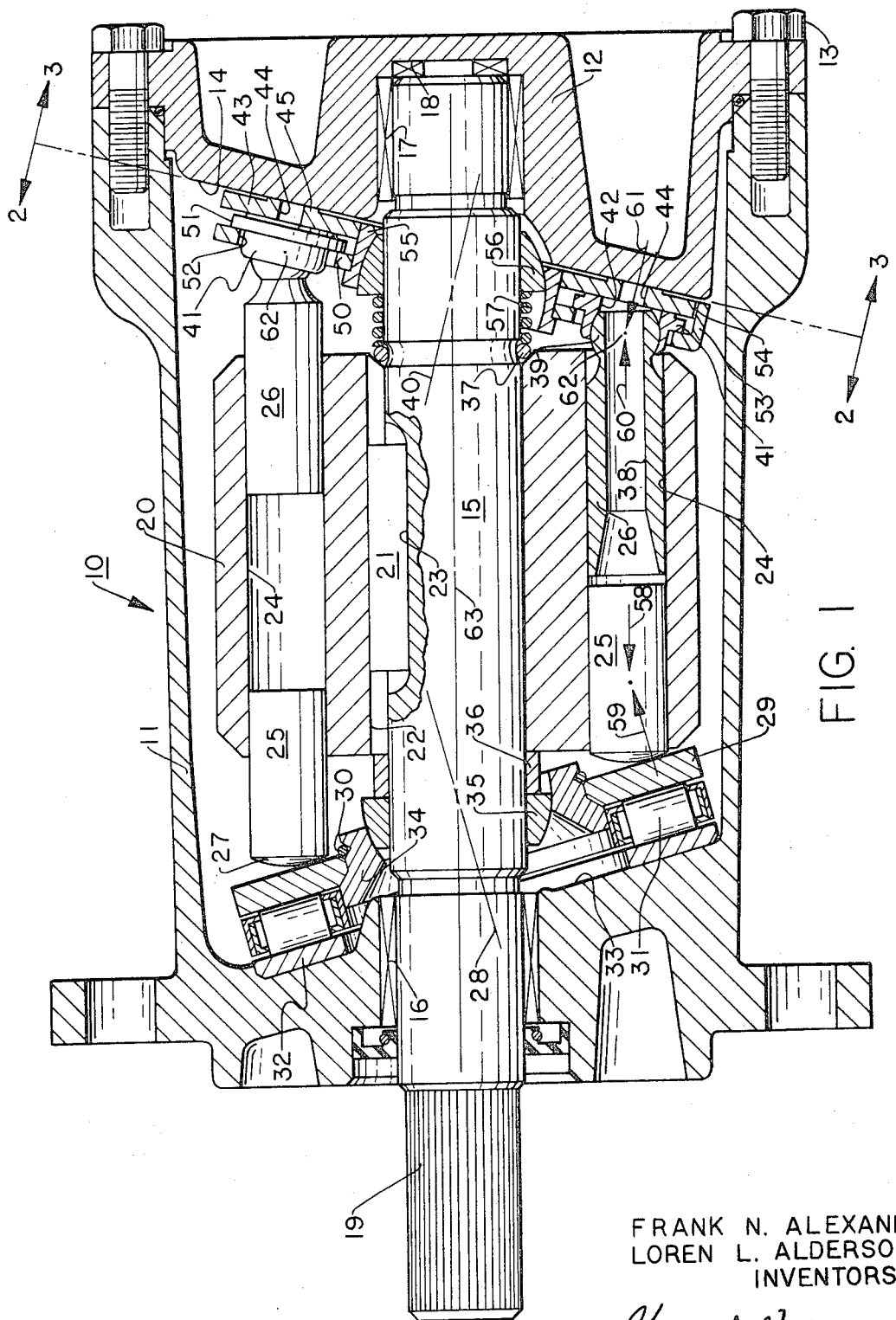
FIG. 1 is an offset longitudinal section of an axial piston motor incorporating two embodiments of the invention.

Turning to the drawings and particularly to FIG. 1, a fixed displacement axial piston unit designated generally by the numeral 10 is illustrated and will be described hereafter as a motor although it is to be understood that the unit is equally adaptable for use as a hydraulic pump.

Figure 3:
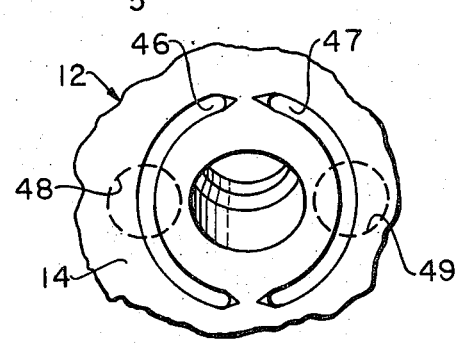
FIG. 3 is a partial view of the fluid porting surface cooperating with the bearing plate, taken along line 3—3 of FIG. 1.

Motor 10 has a housing 11 closed by backplate 12 secured by bolts 13. Backplate 12 forms a fixed inclined cam surface 14 having a pair of fluid ports 48 and 49 formed therein, as shown in FIG. 3, communicating with arcuate kidney-shaped openings 46 and 47 in surface 14. Drive shaft 15 extends axially through the center of the housing and is piloted for rotation in the housing by bearings 16 and 17. Bearing 18 absorbs any rightward end thrust imposed on drive shaft 15. The extension 19 of the drive shaft is splined for connection to drive a work performing implement.

Shaft 15 supports and radially locates a cylinder block or rotor 20 secured to shaft 15 through a key 21 located in grooves 22 and 23 on the cylinder block and drive shaft respectively. A plurality of annularly arranged spaced chambers 24 extend through cylinder block 20, and a pair of opposed pistons 25, 26 are disposed for reciprocation within each piston chamber 24. Engagement means on the outer ends of pistons 25 and 26 contact flat surfaces of plates 29 and 43 which are inclined to the longitudinal axis of rotation 63 of the drive shaft.

Upon introduction of pressure fluid from one of ports 48, 49 to chambers 24, which will be described in detail hereafter, axial thrust denoted by arrows 58 and 60 urge pistons 25 and 26 toward plates 29 and 43. The pistons ride up the inclined plates from the retracted to the extended positions shown, thereby rotating cylinder block 20 and shaft 15. As the pistons rotate back to the retracted positions through the remainder of a full revolution, chambers 24 communicate with the other of ports 48 and 49 which is connected with low pressure to accommodate displacement of fluid from bores 24. It will be readily apparent that rotation of the unit can be reversed by interchanging the high and low pressure fluid connections to ports 48 and 49.

Pistons 25 have engagement means in the form of spherical outer ends 27 contacting a ring-shaped race plate 29 of a roller bearing assembly that includes a common roller cage assembly 31. Assembly 31 bears against a nonrotating insert plate 32 formed of hardened material and lying on the inclined cam surface 33 of housing 11.

Circular plate 29 with opposite parallel faces in engagement with the piston ends and roller cage assembly is arranged wtih its internal diameter mating closely with the periphery of a generally cylindrical radial guide or pilot ring 34. Ring 34, arranged generally parallel to plate 29, has a peripheral extension also closely cooperating with the interior surface of roller cage assembly 31. Pilot ring 34 is formed having a spherical inner surface movably engaging a mating outer spherical surface of centrally positioned pivot 35 having a central bore accepting shaft 15. Pivot 35 is slidably received upon shaft 15 such that pivot 35, ring 34, race plate 29 and roller cage assembly 31 are all radially located and concentrically positioned from shaft 15. To axially position these elements between housing 11 and cylinder block 20, a snap ring 30 is included in a groove on the outer periphery of pilot ring 34, and a cylindrical shim spacer 36 is interposed between cylinder block 20 and pivot 35. The right end of cylinder block 20 engages snap ring 37 in a groove on the drive shaft to securely position cylinder block 20 and elements 26-36 between surface 33 and snap ring 37. It is to be noted also that this arrangement allows leftward axial thrust experienced by shaft 15 to be taken by the roller bearing assembly through the cylinder block, spacer 36, pivot 35, pilot ring 34, snap ring 30 and race plate 29.

Engagement means 27 form a single pivot or universal joint between the piston and race plate for transmitting the axially directed thrust 58 on each piston 25 against the inclined race plate 29. The resulting reaction force, illustrated by arrow 59, is directed through the geometric center of sphere end 27. Frictional contact between race plate 29 and the spherical ends of pistons 25 drives the race plate about its inclined axis 28 at an angular velocity approximately equal to the angular velocity of the cylinder block and pistons about shaft axis 63. Spherical ends 27 oscillate with a rolling motion upon race 29 during each revolution of the cylinder block because pistons 25 rotate concentrically to shaft axis 63 and describe an elliptical path relative to inclined surface 33. This rolling motion, however, is of a minor nature creating little friction and wear as compared to that created were pistons 25 to be running against a nonrotating surface. The roller cage assembly 31 rotates about axis 28 at an angular velocity equal to the average of the speeds of the plates 32 and 29 which its rollers engage, or in other words, half the speed of race plate 29.

As mentioned, race plate 29 and roller cage assembly 31 are radially constrained and piloted to ring 34, pivot 35 and shaft 15. Consequently, any forces perpendicular to the shaft axis experienced by plate 29 are transmitted through the pilot means and absorbed by drive shaft bearings 16 and 17. These perpendicularly directed forces transmitted through the universally joined ring 34 and pivot 35 to the drive shaft bearings are designated side loads.

Pilot ring 34 and pivot 35 also rotate in synchronization with drive shaft 15 and race plate 29 as a result of the frictional engagement between the periphery of ring 34 and rotating race plate 29 and the frictional contact between the internal surface of pivot 35 and rotating drive shaft 15. This synchronized rotation accordingly eliminates frictional drag and waer between race plate 29, ring 34, pivot 35 and shaft 15. Though the race plate is strongly pressed against the piloting assembly, friction and wear are nonexistent as the race plate and pilot assembly move together. The mating spherical portions of ring 34 and pivot 35 provide bearing surfaces allowing inclined ring 34 to wobble or oscillate upon pivot 35 during unit operation.

The outer ends of pistons 26 in FIG. 1 represent another embodiment of the invention; the piston axial thrust is again transmitted through a pivot point on the piston against an inclined rotating plate engaging the piston ends. The rotating plate again serves as a bearing for absorbing the end thrust from the reciprocating pistons, in this instance a hydrostatic fluid bearing, and additionally serves to port high and low pressure fluid from backplate 12 to piston chambers 24.

Each piston 26 has a hollow interior bore 38 and an outer end formed as a truncated spherical ball 39. A flanged slipper shoe 41 with hollow interior 42 is swaged to and pivotal on the ball portion 39 of piston 26. The flanged faces of shoes 41 forwardly contact a flat face of annular bearing or connector plate 43 that, as will be described below, rotates about axis 40 in synchronization with the pistons. As they rotate about the drive shaft axis 63, shoes 41 slide in a generally circular motion on inclined plate 43 during each revolution of the cylinder block. Other than this sliding movement, which is of a minor nature imposing minimal wear problems between shoes 41 and plate 43, the synchronized rotation of the connector plate and pistons totally eliminate relative movement and consequent wear between shoes 41 and bearing plate 43.

Fluid pressure in each of the bores 24 exerts axial thrust, illustrated by arrow 60, upon pistons 26 forcing them to ride up the inclined cam surface, withdraw from the piston bores and create the torque which rotates the cylinder block and drive shaft. The universal connection of shoes 41 to pistons 26 transmits a force from the piston 26 against the bearing plate 43. The resulting reaction force, similar to thrust 59 on pistons 25, is illustrated by arrow 61 and is directed through the geometric center 62 of piston spherical portion 39.

Figure 2:
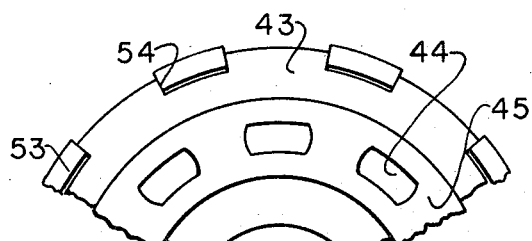
FIG. 2 is a partial view of the bearing plate taken along line 2—2 of FIG. 1.

As shown both in FIGS. 1 and 2, connector plate 43 has a plurality of slots 44, one communicating with each of the slipper shoe hollow interiors 42. Slots 44 are surrounded by a continuous raised land 45. Leakage of pressurized fluid from slots 44 between land 45 and cam surface 14 forms the hydrostatic bearing, a thin film of pressurized fluid between land 45 and surface 14, substantially balancing the hydraulic piston end thrust and providing lubrication between the rotating plate 43 and stationary cam surface 14.

Surface 14 of backplate 12 as shown in FIGS. 1 and 3 mates with the face of connector plate 43 in FIG. 2 such that land 45 of connector plate 43 seals both of kidney openings 46 and 47 of the backplate, and slots 44 of connector plate 43 sequentially register with openings 46, 47 as plate 43 rotates. During each revolution of the cylinder block and connector plate 43, each piston chamber 24 communicates sequentially with kidney openings 46 and 47 through registering slots 44.

Referring again to FIG. 1, connector plate 43 is driven by spider plate 50 which engages the rearward side of the flange 51 on each piston shoe 41. Shoes 41 extend through openings 52 in spider plate 50, which are enlarged to allow the sliding oscillatory motion of the shoes on the connector plate. Plate 50 has a plurality of tangs 53 which fit into cooperating recesses 54 in connector plate 43. The peripheral location of tangs 53 of plate 50 are shown in FIG. 2; however, it will be obvious the tangs may also be placed inwardly of the periphery. Rotation of the pistons 26 and affixed shoes 41 drives spider plate 50 about axis 40 at the wall of its openings 52, which in turn drives connector plate 43 through tangs 53 about axis 40 in synchronized rotation with pistons 26. Spider plate 50 is located so that the plane containing the centers 62 of the spherical piston ends 39 falls between the plane surfaces of the spider plate. Such arrangement minimizes tipping, cocking and rolling of shoes 41 and the driving force is transmitted through the universally connected pistons and shoes to spider plate 50. It will be readily apparent to those skilled in the art that spider plate 50 and connector plate 43 may be formed as a single piece having oversized blind bores similar to bores 52 for accepting the piston shoes.

Interiorly positioned and closely fitting plates 43 and 50 is flanged pilot guide 55. Cylindrically-shaped guide 55 is symmetrically disposed about inclined axis 40 and has a concave spherical inner surface engaging a mating spherical outer surface of pivot 56 similar to pivot 35 at the opposite end of the motor. These mating spherical surfaces universally connect pivot 56 and pilot guide 55 to permit oscillation therebetween during unit operation. Pivot 56 slidably but closely fits upon shaft 15 so that plates 43 and 50 are radially piloted from the shaft through pilot guide 55 and pivot 56. Pilot guide 55, illustrated as a separate component, may be formed integral with either of spider plate 50 and connector plate 43.

Pilot guide 55 and pivot 56, in a manner similar to that described of pilot ring 34 and pivot 35, are carried in synchronous rotation with plates 43 and 50 through frictional engagement with these plates and shaft 15. Side loads on spider plate 50 and connector plate 43 are transmitted through the radial pilot means to the drive shaft bearings 16 and 17, in the manner as previously described with reference to race plate 29.

Light spring 57 extends between snap ring 37 and pivot 56 to provide a seating force to assist in holding piston shoes 41 against connector plate 43 and plate 43 against backplate surface 14. Spring 57 acts through pivot 56 and the flange of pilot guide 55 to urge spider plate 50, the shoes, pistons and connector plate 43 rightwardly toward backplate 12.

Thus, it is apparent that at both ends of motor 10, a rotating bearing plate is provided to contact the rotating pistons and that these bearing plates 29, 43 are radially positioned by pilot means that also rotate. By so eliminating relative rotation between plates 29, 43 and their radial pilots, friction and wear between the above-mentioned parts are drastically reduced, and unit life and efficiency are accordingly increased. The embodiment of the invention incorporated at th outer ends of piston 26 additionally provides a simple economical construction for positively driving the valving connector plate 43 in synchronization with the cylinder block and pistons.

FIGURE 4 EMBODIMENT

Figure 4:
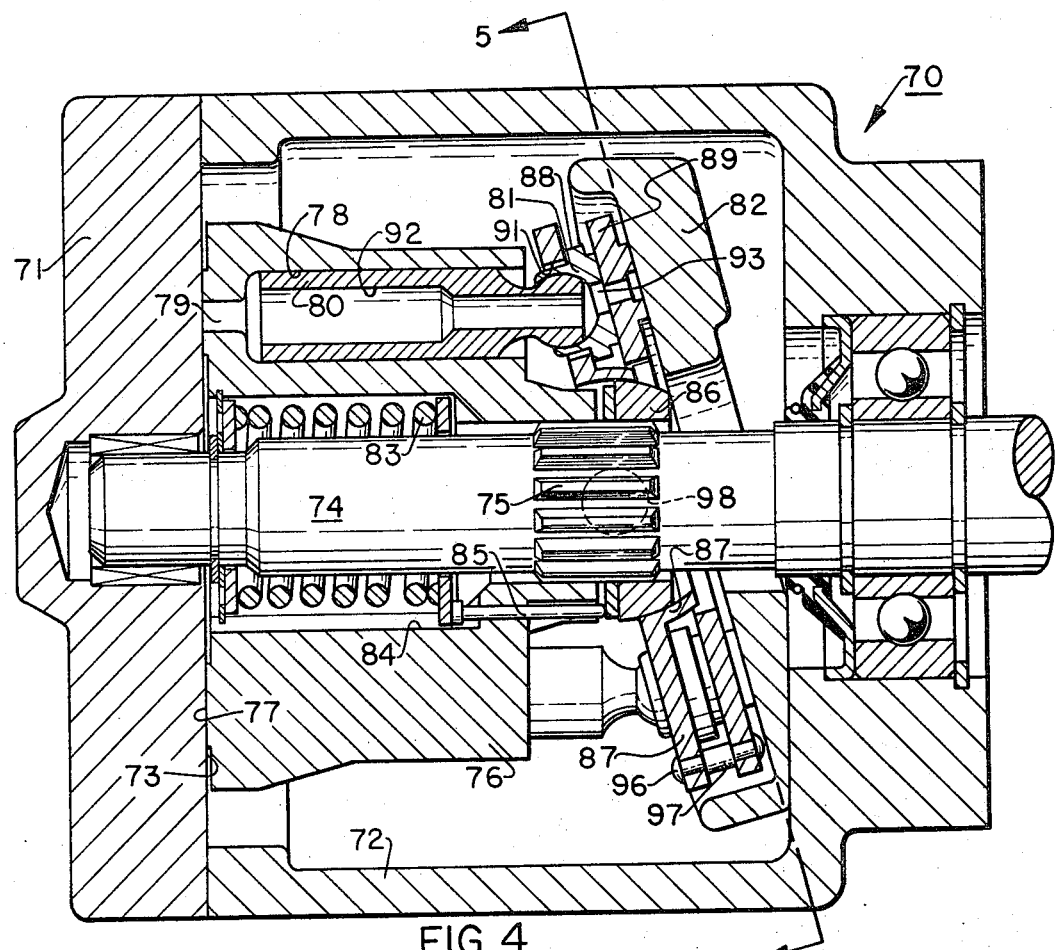
FIG. 4 is a longitudinal section of an axial piston pump incorporating another embodiment of the invention.

A conventional variable displacement axial piston unit 70 is illustrated in FIG. 4 incorporating a slipper shoe embodiment of the present invention similar to that illustrated at the outer ends of pistons 26 in FIG. 1. The unit will be described in operation as a hydraulic pump although it is equally adaptable for use as a motor.

Pump 70 includes a drive shaft 74 extending through housing 72 into backplate 71 and drivingly engaging a rotary cylinder block 76 at spline 75. The annularly arranged piston chambers 78 in which are disposed pistons 80 communicate through ports 79 with fluid valving ports, similar to kidney slots 46 and 47 shown in FIG. 3, in backplate 71 opening onto face 73 which is in intimate contact with cylinder block face 77. The outer ends of pistons 80 are urged into axial reciprocation through cooperation with variably inclined cam plate 82 to retract into bores 78 and expel pressure fluid through the backplate ports upon rotation of cylinder block 76 by the drive shaft. Cam plate 82 is movable upon its pivoted support 98, shown by a dashed line, to housing 72 in order to vary pump displacement. Both the variable cam plate construction and general operation of pump 70 are well known to the art and will not be described in detail.

Similar to pistons 26 of FIG. 1, pistons 80 have flanged slipper shoes 81 pivotally secured to their outer spherical ends. Shoes 81 forwardly engage bearing plate 89 interposed between the shoes and the inclined face of cam plate 82. The single pivotal connections of pistons 80 and shoes 81 transmits axial piston thrust against the inclined bearing plate. The pistons and shoes 81 extend through enlarged openings 91 of a spider plate 87 allowing circular movement of the shoes relative to the inclined spider and bearing plates 87 and 89 as was described with reference to FIG. 1. Spider plate 87 further has an interior spherical surface universally joined to centrally located pivot 86. Pivot 86 is mounted to spline 75 of drive shaft 74 to rotate with the shaft.

Figure 5:
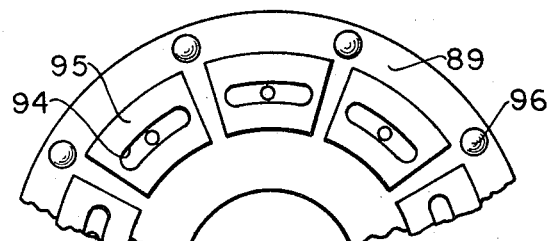
FIG. 5 is a partial view of the bearing plate taken along line 5—5 of FIG. 4.

Similar to connector plate 43 of FIG. 1, a hydrostatic fluid bearing is provided at the face of bearing plate 89 shown in FIG. 5, which rides against cam plate 82. This hydrostatic bearing absorbs the hydraulic axial thrust exerted on pistons 80 by pressure in bores 78. Referring to both FIGS. 4 and 5, the hydrostatic bearing is supplied with fluid from each piston bore 78 through conduits 92 and 93 in piston 80 and shoe 81 to recess 94 in bearing plate 89. A corresponding recess 94 is provided for each piston, and each recess is surrounnded by a separate raised land or pad 95 under which pressure fluid leaks from recess 94 to form the hydrostatic bearing. Pressure in recesses 94 and along pads 95 counteracts the axial thrust on pistons 80, and the thin pressure fluid film on pads 95 provides lubrication between the pads and cam plate 82.

An important feature of our invention is the unitary, synchronized rotation of spider plate 87, bearing plate 89 and pivot 86 with the cylinder block and drive shaft. The synchronized rotation eliminates wear and friction between the parts mentioned and provides an economical, simplified piston pump construction. The piston and shoe assemblies drive spider plate 87 by engaging the walls of oversized bores 91. Bearing plate 89 is mechanically fastened to spider plate 87 by a plurality of rivets 96, and is thus driven in synchronous rotation with the spider plate and pistons. Rivets 96 have enlarged central portions 97 which act to space plate 87 away from plate 89 a sufficient distance to free shoes 81 for the previously-described movement upon plate 89, and to locate spider plate 87 whereby the plane of the spherical piston end centers falls within the spider plate, which prevents the cocking of shoes 81 as the driving force is transmitted to spider plate 87. As mentioned, pivot 86 is positively driven through its splined engagement with shaft 74.

The close cooperation of the spider plate and pivot spherical surfaces radially locates or pilots spider plate 87 to the drive shaft. Bearing plate 89 is accordingly radially located in consequence of its riveted connection to plate 87. Thus, the spider plate may be utilized to radially pilot, as well as rotatively drive, the piston-engaging bearing plate 89. The side forces experienced by plates 87 and 89 are transmitted to the drive shaft through the radial pilot means.

A spring 83 situated in cylinder block central bore 84 acts through a plurality of pins 85 and pivot 86 to bias the riveted spider and bearing plates 87 and 89 toward the cam plate. By engaging flange 88 of each piston shoe 81, spider plate 87 transmits the bias of spring 83 to pull pistons 80 out of bores 78 and maintain shoes 81 in sealing arrangement with plate 89 during the withdrawal stroke of the pistons when chambers 78 are filling with low pressure fluid supplied through the backplate.

The preferred embodiments of the invention as specifically set forth above being subject to various modifications by those skilled in the art are to be considered exemplary in nature and not limiting to the scope and spirit of the invention as set forth in the appended claims.

Having described our invention with sufficient clarity so that those skilled in the art may construct and use it, we claim:

1. An axial piston device comprising a housing, a drive shaft extending axially into the housing, a cylinder block affixed for rotation with said drive shaft and having a plurality of annularly arranged axial cylinder bores therein, pistons reciprocally mounted in said bores and having their outer ends extending therefrom in an axial direction toward a cam surface in the housing inclined or inclinable to the drive shaft axis, pivot means on the outer ends of the pistons and valve means successively controlling fluid flow to said cylinder bores, a mechanical bearing assembly supported upon said cam surface, said bearing assembly including a race plate supported on a roller and cage assembly, the race plate contacting said piston pivot means whereby axial thrust imposed on each piston is transmitted through said pivot means against the race plate to be absorbed by said bearing assembly, said race plate mounted to rotate with the drive shaft and cylinder block, and pilot means adapted for rotation with the drive shaft and engaging said race plate to radially locate said race plate with respect to said drive shaft, said pilot adapted to transfer side loads imposed on said race plate to the drive shaft.

2. An axial piston device comprising a drive shaft rotatably mounted in a housing, first and second cam surfaces inclined to the drive shaft axis at opposite ends of said housing, a pair of fluid valving slots in said housing opening onto the second inclined cam surface;
   a cylinder block having a plurality of axial through chambers, said cylinder block located intermediate the inclined cam surfaces and radially positioned and mounted for rotation upon the drive shaft;
   first and second pistons in each of said chambers extending from the cylinder block respectively toward the first and second inclined cam surfaces, said pistons having spherically shaped outer ends, said second pistons having interior passages through the pistons communicating with said chambers;
   a roller bearing assembly adjacent to the first cam surface having a race plate contacting said first piston spherically ends whereby said race plate rotates with the cylinder block;
   a first radial pilot contacting an interior bore of said race plate and having a spherical inner surface;
   a first pivot radially positioned upon the drive shaft having an outer spherical surface cooperating with said first pilot spherical surface to radially locate said race plate relative to the drive shaft, said first pivot and first radial pilot mounted to rotate with the drive shaft and race plate;
   a slipper shoe pivotally mounted to the spherical outer ends of each of said second pistons having an interior through passage communicating with said second piston interior passage;
   a bearing plate inclined with the second cam surface located with opposite faces in sealing engagement with said shoes and the second cam surface, said bearing plate having separated through passages communicating said chambers with said valving slots through said second piston and shoe interior passages;
   a spider plate intermediate the cylinder block and said bearing plate and in rotary driven engagement with said shoes, said spider having a plurality of peripherally located tangs drivingly engaging slots in said bearing plate, whereby said bearing plate is driven in synchronization with the cylinder block;

a second radial pilot contacting interior bores of said spider plate and bearing plate and having a spherical inner surface; and,
   a second pivot radially positioned upon the drive shaft having an outer spherical surface cooperating with said second pilot spherical surface to radially locate said bearing and spider plates relative to the drive shaft, said second pivot and second radial pilot mounted to rotate with the drive shaft and said bearing and spider plates.

3. An axial piston device comprising a housing; a backplate closing one end of the housing and provided with fluid valving ports therein; a drive shaft extending through the housing and mounted in bearings in the housing and backplate; a cylinder block within the housing drivingly engaging and radially located on the drive shaft and having a face abutting said backplate, said cylinder block having a plurality of axially disposed chambers therein, said cylinder block further having ports opening onto said face of the cylinder block abutting said backplate to communicate with said valving ports therein; an inclined swash plate located at the opposite end of the housing;

pistons reciprocally mounted in said chambers with outer spherical ends extending therefrom to cooperate with the swash plate whereby rotation of the cylinder block causes reciprocation of said pistons, said pistons having an interior through passage;

a slipper shoe pivotally mounted to the outer spherical end of each piston, said shoes each having a flanged lip, a planar surface parallel to the inclined swash plate, and an interior through passage communicating with the associated piston interior passage;

a spider plate having openings for receiving said shoes and tangs around the periphery of the plate, the lips of said shoes engaging said plate and being in driven engagement with said shoes at said openings;

an axially slidable central pivot radially located on the drive shaft having an outer spherical surface engaging a spherical surface on said spider thereby radially positioning said spider plate relative to the drive shaft;

spring means acting against said pivot to urge same toward the swash plate and thereby acting through said spider and said shoe flanged lips to urge said pistons toward the swash plate;

a bearing plate interposed between the swash plate and said shoe planar surfaces having passages communicating with said shoe interior passages to deliver fluid to and from said chambers and provide a fluid bearing between said bearing plate and swash plate, notches in the peripheral edge of the bearing plate which receive the tangs of the spider plate to rotatively drive said bearing plate in synchronization with said spider plate.

4. The device of claim 1 wherein the tangs on spider plate extend axially therefrom into engagement with the notches in the bearing plate to provide a drive coupling releasable by axial separation of the spider plate and bearing plate.

5. A device of claim 1 wherein the tangs are of predetermined length to provide a minimum spacing between the spider plate and bearing plate no less than the width of said shoe lips.

* * * * *